United States Patent
Gulwani et al.

(10) Patent No.: US 10,698,571 B2
(45) Date of Patent: Jun. 30, 2020

(54) BEHAVIOR FEATURE USE IN PROGRAMMING BY EXAMPLE

(71) Applicant: Microsoft Technology Licensing, LLC, Redmond, WA (US)

(72) Inventors: Sumit Gulwani, Sammamish, WA (US); Kevin Michael Ellis, Cambridge, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 679 days.

(21) Appl. No.: 15/394,238

(22) Filed: Dec. 29, 2016

(65) Prior Publication Data

US 2018/0188897 A1   Jul. 5, 2018

(51) Int. Cl.
| | |
|---|---|
| *G06F 3/0482* | (2013.01) |
| *G06N 20/00* | (2019.01) |
| *G06F 3/0488* | (2013.01) |
| *G06F 8/30* | (2018.01) |
| *G06F 40/18* | (2020.01) |

(52) U.S. Cl.
CPC .......... *G06F 3/0482* (2013.01); *G06F 3/0488* (2013.01); *G06F 8/30* (2013.01); *G06F 40/18* (2020.01); *G06N 20/00* (2019.01)

(58) Field of Classification Search
CPC ........ G06F 8/30; G06F 3/0482; G06F 3/0488; G06F 40/18; G06N 20/00
See application file for complete search history.

(56) References Cited

U.S. PATENT DOCUMENTS

| | | | |
|---|---|---|---|
| 6,219,827 B1* | 4/2001 | Man | G06F 12/121 711/133 |
| 6,557,011 B1* | 4/2003 | Sevitsky | G06F 11/3636 |
| 7,324,984 B2 | 1/2008 | Tovinkere et al. | |
| 7,801,839 B2 | 9/2010 | Kates et al. | |
| 8,249,336 B2 | 8/2012 | Arasu et al. | |

(Continued)

OTHER PUBLICATIONS

Brad A. Myers, "Visual Programming, Programming by Example, and Program Visualization: A Taxonomy", [Online}, 1986, pp. 59-66, [Retrieved from Interenet on Jul. 13, 2019], <http://www.cs.cmu.edu/~bam/papers/chi86vltax.pdf>.*

(Continued)

*Primary Examiner* — Ziaul A Chowdhury
(74) *Attorney, Agent, or Firm* — Workman Nydegger

(57) ABSTRACT

Technologies for narrowing the choices for programs that each comply with example behaviors provided by a user in programming by example. Even if the user provides insufficient behavior examples to precisely identify a program that should be used, the system still uses program behavior features (along with potentially structure features) of the program in order to identify suitability of each program that would comply with the specific set of behavior examples. A particular program is then selected and enabled for that user so that the particular program performs behaviors exemplified by the one or more program behavior examples. In the case where user assistance is used in selection of the program, the suitability for each possible program may be used to decide which of multiple possible programs should be made selectable by the user. Those higher suitability programs might be visualized to the user for selection.

18 Claims, 5 Drawing Sheets

(56) References Cited

U.S. PATENT DOCUMENTS

| | | | |
|---|---|---|---|
| 8,538,909 B2 | 9/2013 | Ranganath et al. | |
| 8,972,930 B2 | 3/2015 | Gulwani | |
| 9,002,758 B2 | 4/2015 | Gulwani et al. | |
| 9,020,945 B1* | 4/2015 | Hollister | G06F 9/50 707/737 |
| 9,400,639 B2 | 7/2016 | Kalai et al. | |
| 2005/0203958 A1* | 9/2005 | Mitchell | G06F 9/4492 |
| 2007/0011652 A1* | 1/2007 | Schneider | G06F 8/36 717/116 |
| 2008/0028468 A1* | 1/2008 | Yi | H04L 63/1416 726/23 |
| 2009/0094590 A1* | 4/2009 | Mendelson | G06F 8/443 717/156 |
| 2010/0162207 A1* | 6/2010 | Nathan | G06F 8/20 717/107 |
| 2011/0302553 A1* | 12/2011 | Gulwani | G06F 9/44 717/107 |
| 2014/0108305 A1* | 4/2014 | Gulwani | G06F 17/2264 706/12 |
| 2014/0337790 A1* | 11/2014 | Kim | G06F 3/0482 715/781 |
| 2015/0254211 A1* | 9/2015 | Gulwani | G06F 17/211 715/256 |
| 2015/0254530 A1* | 9/2015 | Gulwani | G06F 16/84 382/187 |
| 2015/0286361 A1* | 10/2015 | Puri | H04W 4/21 715/719 |
| 2015/0331416 A1 | 11/2015 | Feniello et al. | |
| 2016/0034688 A1* | 2/2016 | Schoenemann | G06F 21/552 726/23 |
| 2016/0259924 A1* | 9/2016 | Dutt | G06F 21/32 |
| 2017/0228107 A1* | 8/2017 | Bhati | G06F 3/0482 |
| 2019/0056840 A1* | 2/2019 | Mamaril | G06F 3/04886 |

OTHER PUBLICATIONS

Daniel Conrad Halbert, "Programming by Example", [Online], 1984, pp. 1-76, [Retrieved from Interenet on Jul. 13, 2019], <https://danhalbert.org/pbe.pdf>.*

Rishabh Singh et al., "Predicting a Correct Program in Programming by Example", [Online], 2015, pp. 1-17, [Retrieved from Interenet on Jul. 13, 2019], <http://people.csail.mit.edu/rishabh/papers/cav15-ranking.pdf>.*

Aditya Krishna Menon et al., "A Machine Learning Framework for Programming by Example", [Online], 2013, [Retrieved from Interenet on Jul. 13, 2019], <http://proceedings.mlr.press/v28/menon13.pdf>.*

Ying Xia et al., "A Program Behavior Matching Architecture for Probabilistic File System Forensics", [Online]. 2008, pp. 4-13, [Retrieved from Interent on Mar. 1, 2020], <https://dl.acm.org/doi/pdf/10.1145/1368506.1368509>.*

Evelyn Duesterwald et al., "Characterizing and Predicting Program Behavior and its Variability", [Online], 2003, pp. 1-12, [Retrieved from Internet on Mar. 1, 2020], <https://ieeexplore.ieee.org/stamp/stamp.jsp?arnumber=1238018>.*

Dean Jerding et al., "Using visualization for architectural localization and extraction", [Online], 2000, pp. 267-284, [Retrieved from Interent on Mar. 1, 2020], <https://pdf.sciencedirectassets.com/271600/1-s2.0-S0167642300X00287/1-s2.0-S0167642399000386/main.pdf>.*

Ste'phane Ducasse et al., "Software Architecture Reconstruction: A Process-Oriented Taxonomy", [Online], 2009, pp. 573-591, [Retrieved from Internet on Mar. 1, 2020], <https://ieeexplore.ieee.org/stamp/stamp.jsp?arnumber=4815276>.*

Singh, Rishabh, "BlinkFill: Semi-supervised Programming by Example for Syntactic String Transformations", In Proceedings of the VLDB Endowment, vol. 9, Issue 10, Jun. 2016, pp. 816-827.

Feniello, et al., "Program Synthesis by Examples for Object Repositioning Tasks", In Journal of IEEE/RSJ International Conference on Intelligent Robots and Systems, Sep. 14, 2014, 8 pages.

Mayer, et al., "User Interaction Models for Disambiguation in Programming by Example", In Proceedings of the 28th Annual ACM Symposium on User Interface Software & Technology, Nov. 8, 2015, 13 pages.

Srivastava, et al., "From Program Verification to Program Synthesis", In Journal of ACM Sigplan Notices, vol. 45, issue 1, Jan. 17, 2010, 14 pages.

* cited by examiner

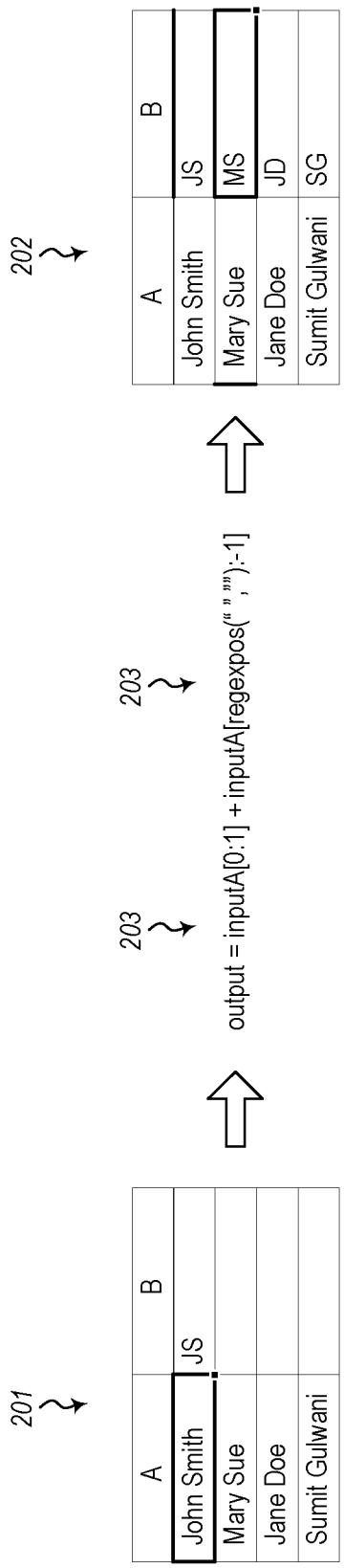

601

| | D | E |
|---|---|---|
| | Richard | Mr. Richard |
| | Steve | |

603 →

602

| | D | E |
|---|---|---|
| | Richard | Mr. Richard |
| | Steve | Ms. Steve |

| | A | B |
|---|---|---|
| 1 | [CPT-00350] | [CPT-00350] |
| 2 | [CPT-00340] | |
| 3 | [CPT-11536] | |
| 4 | [CPT-11222] | |
| 5 | [CPT-115] | |

703 →

702

| | A | B |
|---|---|---|
| 1 | [CPT-00350] | [CPT-00350] |
| 2 | [CPT-00340] | [CPT-00340] |
| 3 | [CPT-11536] | [CPT-11536] |
| 4 | [CPT-11222] | [CPT-11222] |
| 5 | [CPT-115] | [CPT-115]] |

*Figure 7*

| Program Input | Program Output |
|---|---|
| 457 124th St S, Seattle, WA 98111<br>98743 Edwards Ave, Los Angeles, CA 78911<br>One Microsoft Way, Redmond, WA 98052<br>11 Main, Bizmark, ND 54891 | Seattle-WA |

*Figure 8*

BEHAVIOR FEATURE USE IN PROGRAMMING BY EXAMPLE

BACKGROUND

Conventionally, the construction of computer programs required the significant and time consuming efforts of a trained computer programmer. Programming by example technologies, on the other hand, allow users to construct and run new programs simply by providing examples of intended behavior. In other words, rather than requiring the user to tell the computer what to do (usually requiring explicit programming), programming by example allows the user to simply show the computer what to do by providing a few examples.

Providing examples of intended behavior is intuitive to a typical human being. After all, humans are familiar with teaching each other how to do something by showing them what to do, and leaving it to the student to apply the demonstrated behavior. Thus, programming by example requires no knowledge of programming languages or special programming techniques. Programming by example thus has the potential to open up new access to flexible computing to a larger population of users who have little or no knowledge of programming.

Programming by example, however, relies on the user to provide examples of behavior. A system evaluates the example behaviors against a vast collection of possible programs with the aim to identifying a program that satisfies the behavior. The identified program is then used to perform the behavior. An example of a behavior might include an input and a corresponding acceptable output. As more and more examples are provided, the system can narrow in on identifying a program that satisfies the demonstrated behavior.

However, the intended behavior could be complex enough that a significant number of examples might be needed in order to determine the intended behavior with sufficient certainty to be able to identify an appropriate program that performs that intended behavior. A typical human being does not want to provide a large number of examples, and/or may not have a large number of examples to provide. Rather, the user often only provides a smaller number of examples, and perhaps even as small as one example.

However, few provided examples are seldom enough to pin down the intended behavior within the vast space of possible programs. Accordingly, the system picks one of the possible programs that has not explicitly been excluded by the example or examples given. Previous approaches to picking a program rely on structure features of the program itself. For instance, there may be a bias towards shorter, simpler, or more naturally structured programs. Whenever the intended behavior is not pinned down by sufficient examples, however, there is a chance that a program will be selected that does not perform the intended behavior will be selected.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the performance of programming by example in which a program is selected and enabled for a user by the user simply providing a set of behavior examples. Even if the user provides insufficient behavior examples to precisely identify a program that should be used, the system still uses behavior features (along with potentially structure features) of the program in order to identify suitability of each program that would comply with the specific set of behavior examples. A particular program is then selected and enabled for that user so that the particular program performs behaviors exemplified by the one or more program behavior examples.

In the case where user assistance is used in selection of the program, the suitability for each possible program may be used to decide which of multiple possible programs should be made selectable by the user. For instance, those higher suitability programs might be visualized to the user, perhaps ranked in order of suitability, allowing the user to intelligently select an appropriate program to complete the programming by example.

In one example case, the behavior examples are provided by the user in the form of input and output sets. That is, for one example, the user provides a particular input, and expresses a desired output given that particular input. If there are only a few of such examples, there might be numerous programs capable of generating the desired output given those inputs, some more suitable for the overall general intended function than others. The principles described herein help resolve this ambiguity by using program behavior features (as well as perhaps program structure features) in order to identify which programs are suitable thereby at least partially narrowing the choice of programs available to perform the function. In one embodiment, the overall behavior domain is data transformation (transforming input data to output data). An example of such a transformation is data extracting (extracting a portion of the data from the input data to thereby generate the output data in a structured tabular form).

Thus, the principles described herein allow more technical feasibility to programming by example in the realistic case in which the user does not provide more than one or a few examples, even for programs that are to perform behaviors that are more complex and/or difficult to predict based on fewer examples. Thus, the principles described herein improve on the functionality of computing technology by making programming by example easier for users to engage in.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates an example of programming by example that shows a lower level of ambiguity in selection of an appropriate program for operating on the input to generate an appropriate output;

FIG. 3 illustrates an example of programming by example that shows a higher level of ambiguity in selection of an appropriate program for operating on the input to generate an appropriate output;

FIG. 6 illustrates an example of following an execution trace to find an overlapping extraction;

FIG. 7 shows a spreadsheet example that shows how program output features can be featurized by output similarity; and FIG. 8 is an example of how semantic knowledge may be used to determine program output features.

DETAILED DESCRIPTION

Figure 1:
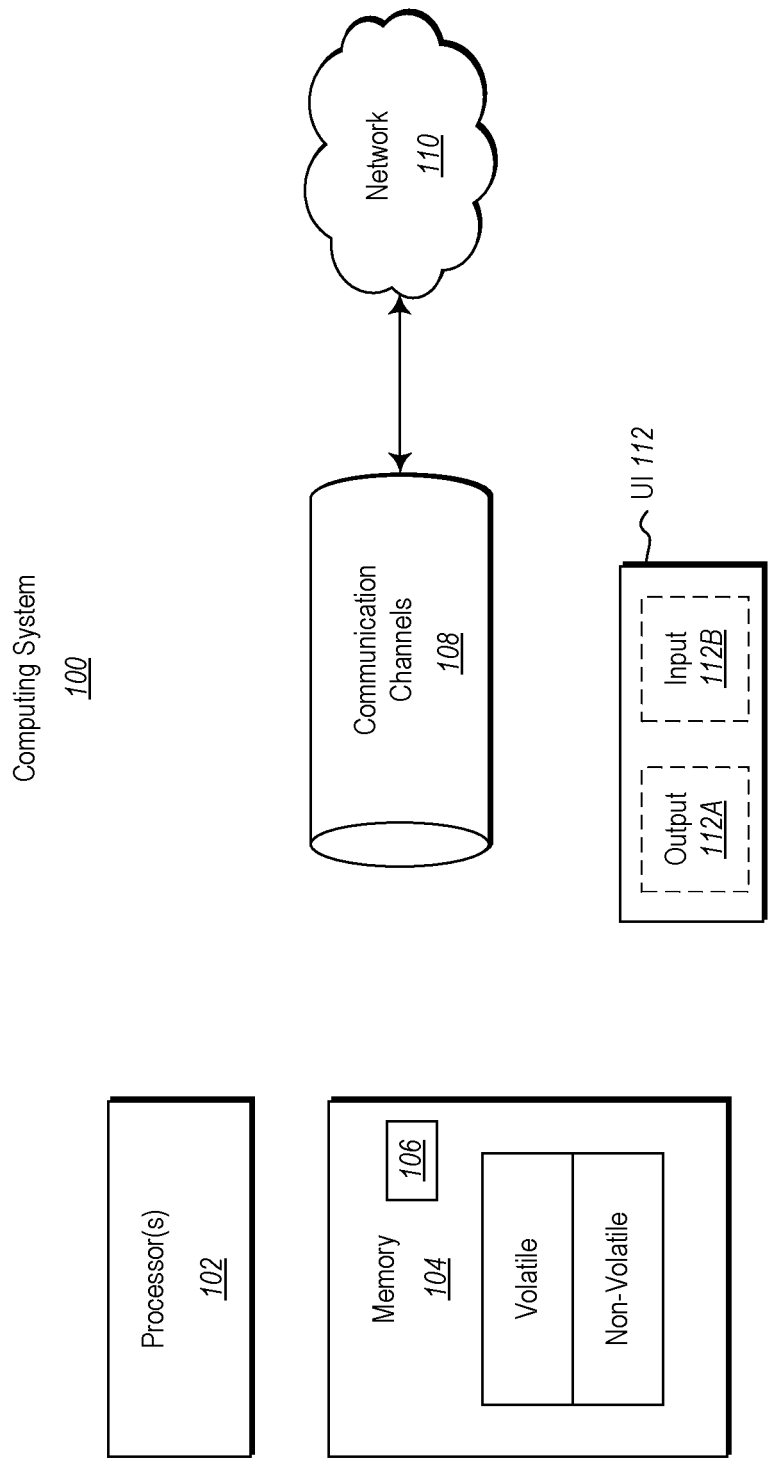
FIG. 1 illustrates an example computer system in which the principles described herein may be employed.

At least some embodiments described herein relate to the performance of programming by example in which a program is selected and enabled for a user by the user simply providing a set of behavior examples. Even if the user provides insufficient behavior examples to precisely identify a program that should be used, the system still uses behavior features (along with potentially structure features) of the program in order to identify suitability of each program that would comply with the specific set of behavior examples. A particular program is then selected and enabled for that user so that the particular program performs behaviors exemplified by the one or more program behavior examples.

In the case where user assistance is used in selection of the program, the suitability for each possible program may be used to decide which of multiple possible programs should be made selectable by the user. For instance, those higher suitability programs might be visualized to the user, perhaps ranked in order of suitability, allowing the user to intelligently select an appropriate program to complete the programming by example.

In one example case, the behavior examples are provided by the user in the form of input and output sets. That is, for one example, the user provides a particular input, and expresses a desired output given that particular input. If there are only a few of such examples, there might be numerous programs capable of generating the desired output given those inputs, some more suitable for the overall general intended function than others. The principles described herein helps resolve this ambiguity by using program behavior features (as well as perhaps program structure features) in order to identify which programs are suitable thereby at least partially narrowing the choice of programs available to perform the function. In one embodiment, the overall behavior domain is data transformation (transforming input data to output data). An example of such a transformation is data extracting (extracting a portion of the data from the input data to thereby generate the output data in a structured tabular form).

Thus, the principles described herein allow more technical feasibility to programming by example in the realistic case in which the user does not provide more than one or a few examples, even for programs that are to perform behaviors that are more complex and/or difficult to predict based on fewer examples. Thus, the principles described herein improve on the functionality of computing technology by making programming by example easier for users to engage in.

Because the principles described herein operate in the context of a computing system, a computing system will be described with respect to FIG. 1. Then, the principles of the narrowing the choices for programs that each comply with example behaviors with respect to FIGS. 2 through 8, where the narrowing is accomplished using program behavioral features of each candidate program.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

In programming by example, the user provides a set of one or more behavior examples, and the system picks or at least suggests programs that will suitably accomplish not only the exact behavior demonstrated by the behavior example(s), but also that will suitably accomplish the more general behavior that is exemplified by the behavior examples. FIGS. 2 and 3 illustrate two examples of programming by behavior.

In FIG. 2, the user is operating in the context of a spreadsheet program and is editing two columns—column A and column B. The spreadsheet program may, for instance, be displayed on a display (e.g., one of the output mechanisms 112A) of a computing system (e.g., the computing system). The left portion 201 shows a state of the spreadsheet showing only what the user has provided (e.g., via an input mechanism 112B of the computing system 100). The right portion 202 shows the state of the spreadsheet after the system has selected a program for transforming the remaining inputs into corresponding output. The program 203 (represented by an example) represents the program that the system selected in order to convert the remaining input into corresponding outputs in accordance with the general behavior that the system estimated from the example behavior of the first row. In this case, the program is an expression that transforms the input into an output (e.g., such as by extracting portions of the input to generate the output).

In the first row of the spreadsheet portion 201, the user provides the behavior example. For instance, in this first row, the user might provide "John Smith" in column A and "JS" in column B. The user is thus showing the system what to do with respect to other inputs in column A, rather than actually writing an expression. Now the user provides in other rows of column A (or spreadsheet portion 201) other input text, and expects the system to select a function that not only would satisfy this behavior example of the first row, but would also follow the general intent most likely exemplified by the example to other inputs.

In the case of FIG. 2, the general behavioral intent exemplified by the example has only a low level of ambiguity. It is fairly clear that the general intent is that the output be represented as a concatenation of the first letter of each text portion that is separated by a space. The system might thus select the program "output=inputA[0:1]+inputA[regex-pos(" "," "):−1] as the program 203. This would be provided as the program for all additional inputs in column A.

Thus, as shown in the resulting spreadsheet portion 202, "Mary Sue" in the second row of Column A would result in "MS" in Column B, through evaluation of the expression. Likewise, "Jane Doe" in Column A would evaluate to "JD" in Column B. "Sumit Gulwani" would evaluate to "SG" in Column B. Thus, programming by example allows for rapid finding of appropriate programs that converts input to output by providing relatively few examples of behavior.

The above was a relatively simple example in which there was little opportunity for ambiguity in what the desired expression was. However, there was still some level of ambiguity. For instance, the user might have intended for the text "JS" to result no matter what the input text is—though this seems an unlikely intent. The user might have alternatively meant that the extraction of the first letter should apply only to the first two words, only to the first at most three words, to all words, and so forth. However, there are other times where few behavior examples can indeed result in many competing and reasonable possible programs to select, if there are but a few behavior examples provided.

As illustrated in FIG. 3, suppose the user indicates that the input "Missing page numbers, 1993" corresponds to output "1993" as an example of a behavior example. Now the user provides an input "64-67, 1995" as another input and asks the system to pick the program for generating the output. The example itself is clear, but the larger intended behavior is actually quite ambiguous. There are in fact innumerable possible larger intended behaviors given this single example.

One possible intended behavior is to extract the first number from the end, in which case the input "64-67, 1995" would evaluate to an output of "1995". Another possible intended behavior is to extract the first number from the beginning, in which case "64-67, 1995" would evaluate to an output of "64". Another possible intended behavior is to extract any number after any comma in which case the input "64-67, 1995" would evaluate to an output of "1995". Another possible intended behavior is to extract only the number after the first comma, in which case the input "64-67, 1995" would evaluate to an output of "1995". Another possible intended behavior is to extract only the number after the last comma, in which case the input "64-67, 1995" would evaluate to an output of "1995". Another possible intended behavior is to always generate the constant string "1993" no matter what the input. So, there is a large degree of ambiguity on what the intended behavior is (and thus what program to select) given the single input provided by the user.

Conventional mechanisms for resolving this ambiguity are based on analysis of program structure features. A simple example of this is to weight the feature of program size so as to provide a bias in favor of selecting smaller programs. Other approaches look possibly also to other structure features that represent the simplicity and naturalness of the program structure in accordance with some learned criterion. Thus, conventional approaches to resolving this ambiguity look to structure features of a program to bias towards programs whose syntactic structure looks plausible. Such an approach has some level of accuracy when predicting the more likely correct programs so as to resolve ambiguity in intended behavior that result from having behavior examples that are insufficient to pin down the exact program.

In accordance with the principles described herein, the correct program is estimated by taking into consideration features of the program that are independent of the structure of the program. That is, the correct program is estimated based on behavior feature(s) of the program. Such program behavior behavioral features might include, for instance, execution trace features of the program, and/or output features of the program. Such behavior features may be used along with program structure features to provide a higher probability of predicting the correct program given a limited set of behavior examples.

Figure 4:
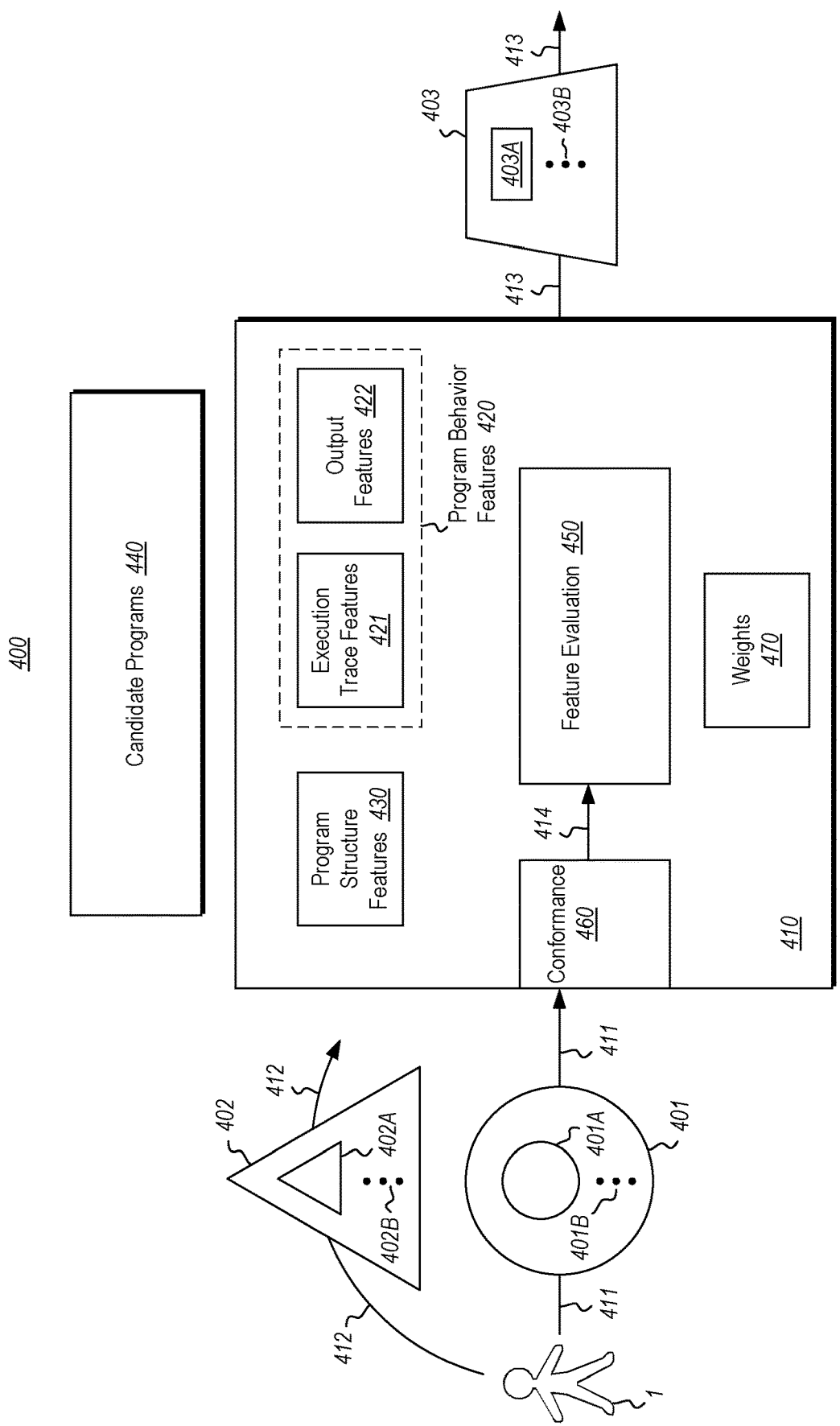
FIG. 4 illustrates a programming by example environment in which the principles described herein may operate.

FIG. 4 illustrates a programming by example environment 400 in which the principles described herein may operate. A user 1 provides (as represented by arrow 411) a set of one or more behavior examples 401 to a program narrowing system 410. The program narrowing system 410 may be, for instance, the computing system 100 of FIG. 1. The program narrowing system 410 then evaluates the program behavior features 420 (as well as potentially the program structure features 430) of candidate programs 440 on the behavior example inputs 402 to thereby output (as represented by arrow 413) a set of one or more programs 403. This is a high level description of FIG. 4. The remaining elements of FIG. 4, and more detail regarding all elements of FIG. 4, will now be described with reference to FIG. 5.

Figure 5:
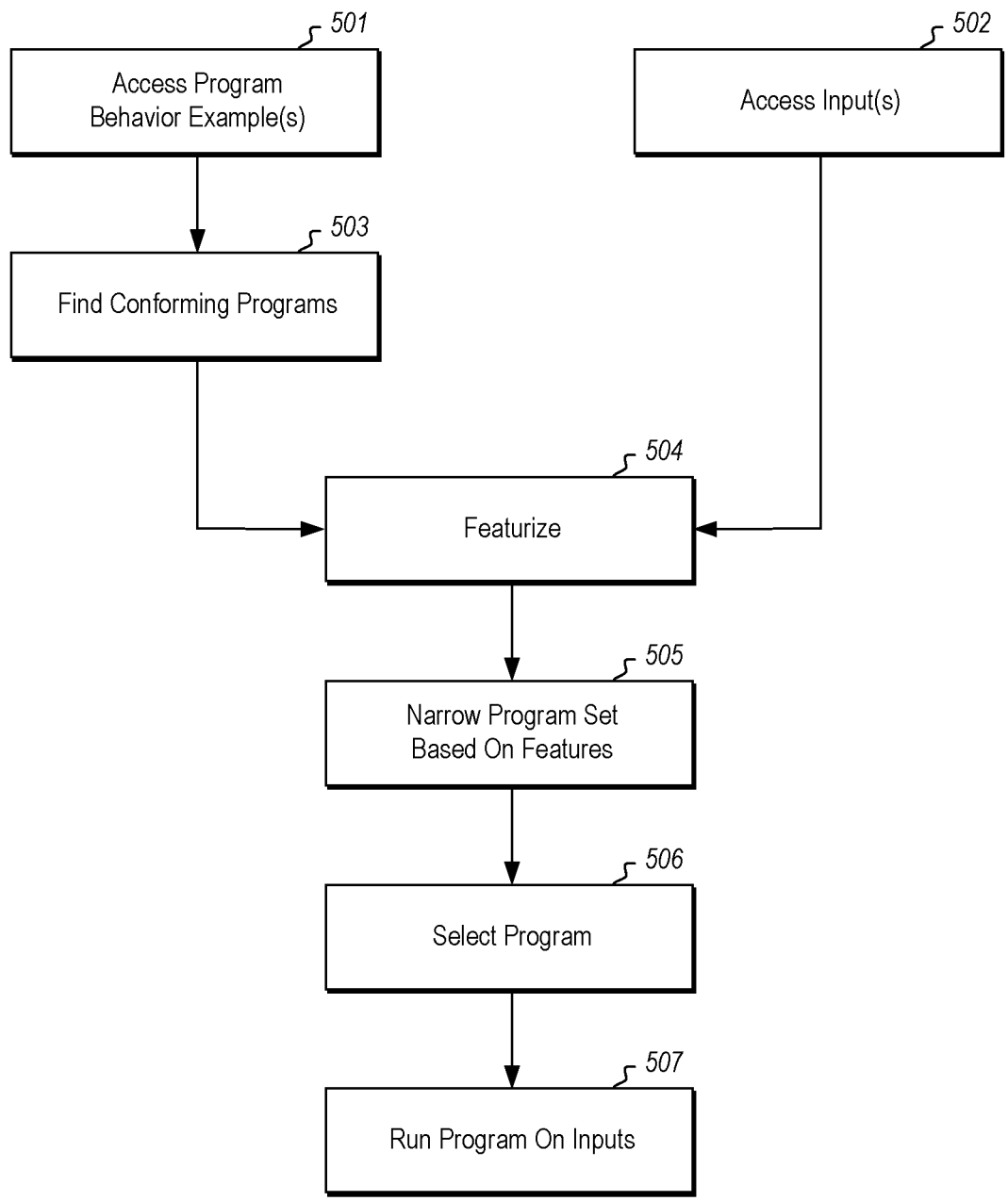
FIG. 5 illustrates a flowchart of a method for performing programming by example, which may be performed in the programming by example environment of FIG. 4.

FIG. 5 illustrates a flowchart of a method 500 for performing programming by example, which may be performed in the programming by example environment 400 of FIG. 4. The method 500 begins by accessing as input a set of one or more behavior examples (act 501). In FIG. 4, this is represented by the user 1 providing (as represented by arrow 411) the behavior example(s) 401 to the programming narrowing system 410. The behavior example(s) are symbolized by circles in FIG. 4. There may be as few as but a single behavior example 401A provided by the user 1. However, the ellipses 401B represent that there may be additional behavior examples provided by the user 1. The more non-redundant behavior examples that are provided, the better the estimate of the intended general behavior, but at a cost of reduced convenience to the user. After all, the providing of a behavior example does take some user effort.

In addition, the user might also optionally provide some further inputs for which there is no precise behavior specified (act 502). Instead, the user might rely on the system to select a program to act on the inputs in accordance with a general intent that is exemplified by the behavior example (s). In FIG. 4, this is represented by the user 1 providing (as represented by arrow 412) input(s) 402 to the programming narrowing system 410. These input(s) are symbolized by triangles in FIG. 4. There may be as few as zero of such inputs, though there is one input 402A explicitly shown in FIG. 4. The ellipses 402B represent that there may be flexibility in this number from as few as zero, to any number one or greater.

As an example, in FIG. 2, the user provides the combination of the input "John Smith" and the output "JS" as a behavior example (e.g., behavior example 401A), whereas each of "Mary Sue", "Jane Doe", and "Sumit Gulwani" are examples of inputs (e.g., inputs 402). In FIG. 3, the user provides the combination of the input "Missing Page numbers, 1993" and the output "1993" as a behavior example (e.g., behavior example 401A), whereas "64-67, 1995" is an example of an input (e.g., input 402A).

The program narrowing system 410 identifies a set of programs that would conform with the behavior example(s) (act 503). A program "conforms with a behavior example" when it performs the exact behavior shown in the example. Thus, in the example of FIG. 2, any program that generates output "JS" based on input "John Smith" is a conforming program. In the example of FIG. 3, any program that generates output "1993" based on input "Missing Page numbers, 1993" is a conforming program. That said, as previously noted, not all conforming programs that conform with the examples are actually following the general intent exemplified by the behavior examples. Therein lies the need to most efficiently and effectively resolve ambiguities on which of the conforming programs to use or suggest. In FIG. 4, a conformance component 460 identifies a set of conforming programs based on the behavior examples, and provides (as represented by arrow 414) the set of conforming programs to a feature evaluation component 450.

The feature evaluation component 450 then evaluates features of the various conforming programs to narrow the set of possible programs (act 505). Some features of the conforming programs may be determined ahead of time. For instance, structure features of pre-constructed programs may be identified well ahead of time.

Alternatively or in addition, features of conforming programs might not be identified until after the conforming programs are identified. For instance, for conforming programs that are not pre-constructed, but are constructed in response to the receipt of example behavior from the user, aspects of the program structure and behavior will not necessarily be known beforehand. Thus, there is an act of featurizing the programs (act 504) that occurs before the evaluation of the features. For some types of program behavior features, such as output features, the candidate program is actually run on the input(s) to verify features of the output. Thus, in that case, in particular, featurization of the output is not performed ahead of time, since the features of the output depend on running of the program to identify what the output would be.

Conventionally, feature evaluation components only looked to program structure features in order to narrow the list of programs from the initial list of candidate programs. However, in accordance with the principles described herein, the feature evaluation component 450 evaluates features of the program that are independent of the program structure. For instance, in FIG. 4, the feature evaluation component 450 evaluates program behavior features 420, which could include one or both of execution trace feature(s) 421 and program output feature(s) 422. Program structure feature(s) 430 may also factor into this narrowing operation.

As part of the narrowing process (in act 505), the feature evaluation component 450 may assign a suitability level to each of the candidate programs. Such a suitability level may be a function of one or more program behavior features, as well as potentially one or more program structure features. Each feature may, for instance, have a weighting associated with it. The weighting may be determined by, for instance, applying machine learning on some training data in order to suitably tune the weights. The machine learning may be a constant or frequent process that result in the weightings being updated. In FIG. 4, the weightings are represented by weights 470.

Ultimately, one of the programs in the narrowed list of programs is selected (act 506), and enabled for the user (act 507) so that the selected program is run against the input(s) 402 to generate outputs. For instance, in the example of FIG. 2, the output spreadsheet 202 may be generated using the selected expression 203. In the example of FIG. 3, the appropriate program may be run against the input "64-77, 1995" to generate the text "1995".

There may be some user intervention associated with the selection of an appropriate program (act 506). After all, it is the user himself of herself that is most familiar with the general intention with respect to the function to be performed by the program and for which he/she provided the behavior examples. Furthermore, it may be far easier for the user to interpret what a program is doing by reviewing the program (or metadata about the program) than it would be for the user to actually write the program.

If the narrowed list of programs is but a single program, the system might automatically implement the program without user intervention, or the user might be asked to approve of the program. For instance, in FIG. 4, there might be but a single program 403A in the narrowed set 403 of possible programs.

If the narrowed list includes multiple programs (there are multiple programs in the narrowed set 403) of possible programs, the programs may be visualized to the user (perhaps ranked according to estimated suitability). The ellipses 403B represent that there may be a variety of different numbers of programs that are included in the narrowed set of programs 403.

If there are too many of such programs in even the narrowed list, perhaps only those programs with a higher suitability are visualized. The user may then select the desired program. The visualization might include some description of what the program does to allow the user to verify that the program would work according to the user's intent. If user intervention is used, then upon detecting user interaction that represents selection of one of the narrowed list of programs, the selected program is enabled and run for the user against the remaining input (act 507).

Because more information is used to narrow the list of possible programs, the chance of selecting a program that correctly follows the user's general intention is greater. This will become apparent from the description of the behavior features that follow.

The program behavior features include, as example, execution trace features and program output features. For instance, in FIG. 4, program behavior features 420 includes execution trace feature(s) 421 and program output features 422. Regarding program output, some program outputs are more likely to be produced by suitable programs that other types of program outputs. The weighting of execution trace features allows for seemingly natural programs with pathological behavior on the provided inputs to be excluded. The biasing over execution trace features allows for biasing based on sequences of computations, rather than just the program that generated those sequences or the outputs that it produced.

Any number of execution trace features may be extracted via evaluation of execution of a program. In a particular example, three execution trace features are used including 1) whether the execution trace has overlapping substring extractions (with a negative bias towards selection of program that have this execution trace feature), 2) whether the execution trace has repeated substring extractions (with a negative bias towards selection of a program having this execution trace feature), and 3) whether the execution trace has adjacent substring extractions (with a positive bias towards selection of a program having this execution trace feature).

FIG. 6 illustrates an example of following an execution trace to find an overlapping extraction. In this case, the program having an overlapping extraction provides a result that is inconsistent with the user's intent. In FIG. 6, there is a spreadsheet that includes Column A (which includes a set of first names), and column B is the output. The first row shows a behavior example. "Richard" is to be converted into "Mr. Richard". One general behavior a user might have wanted to demonstrate by this is to put an appropriate prefix (Mr. or Ms.) in front of the first name.

In FIG. 6, the left portion 601 shows the fields input by the user, and the right portion 602 shows an example of the resulting portion 602 after a text transformation (represented by arrow 603). In this case, suppose the transformation that the system chose was to first extract character 1, and then formulate a prefix by first introducing "M" followed by the lower case form of the exacted character, and then adding a period "." symbol. Then, characters 1 through 7 are extracted and appended to this prefix after a space. This is certainly conforming with the example given as such would result in "Richard" being transformed into "Mr. Richard". However, when that same transformation is applied to the input "Steve", the result is "Ms. Steve". The transformation on input "Angela" would read "Ma. Angela".

This transformation involves overlapping extractions. Character 1 is extracted followed by the extraction of characters 1 through 7. Character 1 is thus extracted twice. This is an overlapping extraction. Yet, when evaluating on program structure only, often programs that extract the first character are preferred. Accessing overlapping regions of data is seldom intended. Usually programs pull out the data they want and then do something with it, rather than repeatedly returning to data already seen. Simply introducing an inductive bias against accessing overlapping regions of the input is enough to disprefer the erroneous program.

Likewise, users do not usually intend to repeat substring extractions, though that negative bias is less than that of overlapping extractions. On the other hand, users often intend to perform adjacent string extractions—and thus a positive bias can be assigned to such execution traces. Thus, the system can apply appropriate biases that depend on how users typically expect a program to execute. Thus, the use of execution trace features of a program can improve the identification of suitable programs in programming by example.

The use of program output features allows for a good prediction of a suitable program based on the output that the program produces on the inputs provided by the user. This is based on the premise that some sets of output are less likely the result of a suitable program than other sets of output. More generally, users typically expect programs to produce similarly formatted outputs, such as all being dates, natural numbers, or addresses. So, there may be a negative bias assigned to output features that represent dissimilarly in output. The system runs each candidate program on all of the inputs provided (e.g., input(s) 402 in FIG. 4) to generate a set of outputs that the system then featurizes.

FIG. 7 again shows a spreadsheet example—the left portion 701 representing the portion input by a user, and the right portion 702 representing an example of the portion after text transformation on the inputs. The transformation is symbolized by arrow 703.

The program that was selected for performing the transformation simply appended a close square bracket "]" on each item of input in order to form the output. Although the user intended to correctly bracket all of the inputs, the baseline system incorrectly inserted an extra bracket on the last input. This erroneous output is an "outlier" that looks different than the other program outputs. One can disprefer the incorrect outputs because it contains an "outlier." As a limiting case scenario, consider a program that is consistent with the provided input/output examples, but throws exceptions on some of the other inputs. Empirically this case occurs often, and is almost surely not the program the user intended.

In one embodiment, clustering of program output is determined. Those outputs that have a specific output schema are assigned into a cluster. If there are lots of clusters, then the program that generated those many clusters is dispreferred. As another example, if there are constant strings (e.g., many outputs correspond to the same string), then that may be dispreferred. If there are simple regular expressions in the output, that may be preferred for program output. If there are special regular expressions, like time, then that output may be very preferred for program output.

The evaluation of output features may use specific semantic knowledge. For instance, consider FIG. 8. Given semantic knowledge of a typical human reader, we know that the intended program behavior is to extract the city and state from the program input. We recognize the input as an address, and the output as a city and state (separated by a hyphen). Given this semantic knowledge, an output of "Los-CA" for the second line of input seems wrong because "Los" is not a realistic name for a town. Likewise, "Angeles-CA" is wrong because "Angeles" is likewise not a realistic name for a town. However, "Los Angeles-CA" is likely correct because "Los Angeles" is a city, and a major one at that, located in California. Thus, the wrongness of output can be determined based on semantic knowledge.

Accordingly, the principles described herein provide an effective mechanism for resolving ambiguity in selecting a program based on relatively few examples in a programming by example environment. Such ambiguity has a higher chance of resolving to a correct program given that program behavior features are taken into appropriate consideration in narrowing the conforming programs to a more manageable list.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors, for performing programming by example by enabling a program for a user using as input a set of one or more program behavior examples provided by the user, the method comprising:
   identifying a plurality of programs that would conform with the set of program behavior examples;
   identifying suitability of a particular program of the plurality of programs based on one or more program behavior features of the particular program, the one or more program behavior features including an execution trace feature obtained by evaluation of execution of the particular program, the execution trace feature including at least one of (i) whether the execution trace of the particular program produces overlapping substring extractions and wherein when the execution trace of the particular program has overlapping substring extractions, the computer system applies a negative bias towards suitability of the particular program; (ii) whether the execution trace of the particular program produces repeated substring extractions and wherein when the execution trace of the particular program has repeated substring extractions, the computer system applies a negative bias towards suitability of the particular program; or (iii) whether the execution trace of the particular program produces adjacent substring extractions and wherein when the execution trace of the particular program has adjacent substring extractions, the computer system applies a positive bias towards suitability of the particular program;
   wherein the execution trace of the particular program has at least one of overlapping substring extractions, repeated substring extractions, or adjacent substring extractions; and
   based at least on the identified suitability of the particular program, enabling the particular program so that the particular program performs behaviors exemplified by the one or more program behavior examples.

2. The method in accordance with claim 1, further comprising:
   identifying suitability of multiple programs of the plurality of programs using one or more program behavior features for each of the multiple programs, the multiple programs including the particular program; and
   prior to enabling the particular program, selecting the particular program from amongst the multiple programs.

3. The method in accordance with claim 2, further comprising:
   visualizing the multiple programs, including the particular program, having a higher identified suitability; and
   detecting user input representing selection of the particular program, the enabling of the particular program performed in response to the detecting of the user input representing selection of the particular program.

4. The method in accordance with claim 1, the set of one or more behavior examples comprising a data transformation example.

5. The method in accordance with claim 1, the set of one or more behavior examples comprising a data extraction example.

6. The method in accordance with claim 5, the identified suitability of the particular program being identified by performing a function that uses a weighting of each of the plurality of program behavior features, the weightings being a product of machine learning.

7. The method in accordance with claim 1, the one or more program behavior features also including an output feature obtained by executing the particular program on the set of program behavior examples, and clustering outputs of running the particular program on the set of program behavior examples based on characteristics of each output, wherein (i) as a number of clusters of the outputs of running the particular program increases, the computer system applies an increasing negative bias towards suitability of the particular program; (ii) as a number of constant strings in the outputs of running the particular program increases, the computer system applies an increasing negative bias towards suitability of the particular program; and (iii) as a number of regular expressions in the outputs of running the particular program increases, the computer system applies an increasing positive bias towards suitability of the particular program.

8. A computer system comprising:
   one or more processors; and
   one or more computer-readable media having stored thereon computer-executable instructions that are structured such that, when executed by the one or more processors, the computer system is caused to perform programming by example by enabling a program for a user using as input a set of program behavior examples provided by the user, the computer-executable instructions including instructions that are structured to cause the computer system to at least:

identify a plurality of programs that would conform with the set of program behavior examples;

identify suitability of a particular program of the plurality of programs based on one or more program behavior features of the particular program, the one or more program behavior features including an execution trace feature obtained by evaluation of execution of the particular program, the execution trace feature including at least one of (i) whether the execution trace of the particular program produces overlapping substring extractions and wherein when the execution trace of the particular program has overlapping substring extractions, the computer system applies a negative bias towards suitability of the particular program; (ii) whether the execution trace of the particular program produces repeated substring extractions and wherein when the execution trace of the particular program has repeated substring extractions, the computer system applies a negative bias towards suitability of the particular program; or (iii) whether the execution trace of the particular program produces adjacent substring extractions and wherein when the execution trace of the particular program has adjacent substring extractions, the computer system applies a positive bias towards suitability of the particular program;

wherein the execution trace of the particular program has at least one of overlapping substring extractions, repeated substring extractions, or adjacent substring extractions; and based at least on the identified suitability of the particular program, enable the particular program so that the particular program performs behaviors exemplified by the one or more program behavior examples.

9. The computer system in accordance with claim 8, the computer-executable instructions also including instructions that are structured to cause the computer system to:

identify suitability of multiple programs of the plurality of programs using one or more program behavior features for each of the multiple programs, the multiple programs including the particular program; and prior to enabling the particular program, select the particular program from amongst the multiple programs.

10. The computer system in accordance with claim 9, the computer-executable instructions also including instructions that are structured to cause the computer system to:

visualize the multiple programs, including the particular program, having a higher identified suitability; and detect user input representing selection of the particular program, the enabling of the particular program performed in response to the detecting of the user input representing selection of the particular program.

11. The computer system in accordance with claim 10, the visualized programs being visually ranked based on the identified suitability.

12. The computer system in accordance with claim 8, the identified suitability of the particular program also being based on at least one program structure feature of the particular program.

13. The computer system in accordance with claim 8, the one or more program behavior features comprising a plurality of program behavior features.

14. The computer system in accordance with claim 8, the identified suitability of the particular program being identified by performing a function that uses a weighting of each of a plurality of program behavior features including the one or more program behavior features.

15. The computer system in accordance with claim 14, the weightings being a product of machine learning.

16. The computer system in accordance with claim 8, the one or more program behavior features also including an output feature obtained by executing the particular program on the set of program behavior examples, and clustering outputs of running the particular program on the set of program behavior examples based on characteristics of each output, wherein (i) as a number of clusters of the outputs of running the particular program increases, the computer system applies an increasing negative bias towards suitability of the particular program; (ii) as a number of constant strings in the outputs of running the particular program increases, the computer system applies an increasing negative bias towards suitability of the particular program; and (iii) as a number of regular expressions in the outputs of running the particular program increases, the computer system applies an increasing positive bias towards suitability of the particular program.

17. A computer program product comprising one or more computer-readable storage media having stored thereon computer-executable instructions that are structured such that, when executed by one or more processors of a computing system, the computing system is caused to perform programming by example by enabling a program for a user using as input a set of program behavior examples provided by the user, the computer-executable instructions including instructions that are structured to cause the computing system to at least:

identify a plurality of programs that would conform with the set of behavior examples;

identify suitability of a particular program of the plurality of programs based on one or more program behavior features of the particular program, the one or more program behavior features including an execution trace feature obtained by evaluation of execution of the particular program, the execution trace feature including at least one of (i) whether the execution trace of the particular program produces overlapping substring extractions and wherein when the execution trace of the particular program has overlapping substring extractions, the computing system applies a negative bias towards suitability of the particular program; (ii) whether the execution trace of the particular program produces repeated substring extractions and wherein when the execution trace of the particular program has repeated substring extractions, the computing system applies a negative bias towards suitability of the particular program; or (iii) whether the execution trace of the particular program produces adjacent substring extractions and wherein when the execution trace of the particular program has adjacent substring extractions, the computing system applies a positive bias towards suitability of the particular program;

wherein the execution trace of the particular program has at least one of overlapping substring extractions, repeated substring extractions, or adjacent substring extractions; and based at least on the identified suitability of the particular program, enable the particular program so that the particular program performs behaviors exemplified by the one or more program behavior examples.

18. The computer program product in accordance with claim 17, the one or more program behavior features also including an output feature obtained by executing the particular program on the set of program behavior examples, and clustering outputs of running the particular program on the set of program behavior examples based on characteristics of each output, wherein (i) as a number of clusters of the outputs of running the particular program increases, the computer system applies an increasing negative bias towards suitability of the particular program; (ii) as a number of constant strings in the outputs of running the particular program increases, the computer system applies an increasing negative bias towards suitability of the particular program; and (iii) as a number of regular expressions in the outputs of running the particular program increases, the computer system applies an increasing positive bias towards suitability of the particular program.

* * * * *